(12) United States Patent
Graf

(10) Patent No.: US 7,562,860 B2
(45) Date of Patent: Jul. 21, 2009

(54) HAND-OPERATED PRESSURE REGULATING VALVE FOR COMPRESSED AIR GUNS

(75) Inventor: Thomas Graf, Stuttgart (DE)

(73) Assignees: Graf-Plastik GmbH & Co. KG Kunststofftechnik, Leinfelden-Echterdingen (DE); George Taylor Brass & Bronze Works Inc., Greenlawn, NY (US)

( * ) Notice: Subject to any disclaimer, the term of this patent is extended or adjusted under 35 U.S.C. 154(b) by 112 days.

(21) Appl. No.: 11/805,144

(22) Filed: May 22, 2007

(65) Prior Publication Data
US 2007/0278443 A1 Dec. 6, 2007

(30) Foreign Application Priority Data
May 22, 2006 (DE) .................. 20 2006 008 212 U

(51) Int. Cl.
*F16K 5/10* (2006.01)
(52) U.S. Cl. ........................... 251/209; 251/297
(58) Field of Classification Search ................ 251/347, 251/263, 340, 205, 208, 209, 297
See application file for complete search history.

(56) References Cited

U.S. PATENT DOCUMENTS

| | | | | |
|---|---|---|---|---|
| 1,085,839 A * | 2/1914 | Acton | ......................... | 401/279 |
| 1,185,309 A * | 5/1916 | Haeseler | ..................... | 55/503 |
| 1,547,768 A * | 7/1925 | Little | .......................... | 369/264 |
| 2,657,709 A * | 11/1953 | Gillerstrom et al. | ...... | 137/614.2 |
| 2,715,512 A * | 8/1955 | Miller et al. | ................ | 251/148 |
| 3,083,944 A * | 4/1963 | Doeden | ....................... | 251/263 |
| 3,645,500 A * | 2/1972 | Walter | ......................... | 251/340 |
| 3,751,000 A * | 8/1973 | Natkanski | ..................... | 251/77 |
| 4,416,338 A * | 11/1983 | Nelson et al. | ............... | 173/206 |
| 4,667,931 A * | 5/1987 | Egert et al. | ................. | 251/340 |
| 6,220,530 B1 * | 4/2001 | Wu | ............................. | 239/583 |

FOREIGN PATENT DOCUMENTS

| | | |
|---|---|---|
| DE | 30 13 235 A1 | 10/1980 |
| DE | 43 19 159 C1 | 7/1994 |
| DE | 43 16 229 A1 | 11/1994 |
| WO | WO03/062542 * 7/2003 | .................... 4/615 |

* cited by examiner

*Primary Examiner*—John K Fristoe, Jr.
*Assistant Examiner*—Marina Tietjen
(74) *Attorney, Agent, or Firm*—Laurence A. Greenberg; Werner H. Stemer; Ralph E. Locher

(57) ABSTRACT

A hand-operated pressure regulating valve for compressed air guns includes a basic valve body with a nozzle passage, threads for connection to a compressed air gun and a nozzle body, a pressure regulating unit and an actuating ring. The regulating unit is held by the ring, with a securing ring, in a bore of the basic valve body. The nozzle passage can be bridged and closed within the bore by a nozzle passage piece. The cross section of the nozzle passage can be reduced and increased by rotation of the ring and displacement of the regulating unit and the passage piece. The regulating unit has a basic body with the passage piece, a spring pin and a compression spring and, in the installed state, the pin projects through the spring out of the basic body and the bore for radial movement transversely and, by rotation of the actuating ring, latches in succession into wells in an inner surface of the actuating ring.

7 Claims, 3 Drawing Sheets

HAND-OPERATED PRESSURE REGULATING VALVE FOR COMPRESSED AIR GUNS

CROSS-REFERENCE TO RELATED APPLICATION

This application claims the priority, under 35 U.S.C. §119, of German Patent Application DE 20 2006 008 212.3, filed May 22, 2006; the prior application is herewith incorporated by reference in its entirety.

BACKGROUND OF THE INVENTION

Field of the Invention

The invention relates to a manually operable pressure regulating valve for compressed air guns, in particular for cleaning purposes in workshops, such as for the cleaning of work tables on cutting machines, of machined workpieces, of soiled internal fittings of electrical and electronic appliances and the like.

Various regulating valves for compressed air guns are known which are disposed either between the compressed air hole and the grip or between the mouth and the nozzle body of a compressed air gun. Those regulating valves are also designated as throttles. They have the disadvantage that the nozzle cross section cannot be adjusted by hand in a simple way, but, instead, they have to be set to a new nozzle cross section by feel through the use of a tool, for example a wrench or pliers. If the setting which has been carried out does not yet give the desired result, the setting has to be carried out anew once again. That method of regulating the cross section and consequently of pressure regulation is time-consuming, complicated in terms of handling and inadequate as regards its effect, since only one cross section can ever be set permanently.

German Published, Non-Prosecuted Patent Application DE 43 16 229 A1 also discloses a hand-operated hydraulic pressure regulating valve which can be set through an actuating lever connected to a cam track for setting the control pressure. In that case, on the side facing away from the cam track, a further cam track is disposed which cooperates with a thrust piece in such a way that, at least at a defined pivot angle, an increase force rise takes effect on the actuating lever, with the result that the adaptation of the regulating characteristic of the pressure regulating valve is largely independent of the regulating springs being used. Those pressure regulating valves have a complicated construction and are unsuitable for use on compressed air guns.

German Patent DE 43 19 159 C1 discloses a compressed air gun for the application of pasty material and a pressure reducing valve, in particular for such a compressed air gun. In that case, a compressed air connection is constructed as a pressure reducing valve. The pressure reducing valve has a valve housing with a fixed valve seat and with a valve body movable with respect to the latter and being prestressed in the opening direction through the use of a spring and being adjustable in the closing direction, counter to the spring force, through the use of a rising pressure on the outlet side. According to the device, a valve body setting element is provided, by the actuation of which the movable valve body can be adjusted in the opening direction, preferably into its full opening position, independently of the outlet-side pressure. In that case, the valve body setting element is constructed as an actuating sleeve displaceable to a limited extent in the axial direction. The actuating sleeve can be displaced between two stops on the valve housing. By setting the actuating sleeve correspondingly in one direction, an annular duct in the valve housing is opened and the compressed air prevailing on the inlet side can not only flow through a main flow duct in the middle of the valve housing, but also enter a spring-containing chamber on the periphery through an orifice through an annular duct and through a second orifice. The increase in compressed air occurring in the chamber moves the valve body into the opening position. When the actuating sleeve is pushed in the opposite direction, the annular duct is shut off and, at the same time, the second orifice to the chamber is released outwardly. The chamber is ventilated outwardly, only the force of the spring still takes effect and the reducing action of the pressure regulating valve occurs in full. That pressure reducing valve for a compressed air gun has a complicated construction and is therefore costly to produce.

German Published, Non-Prosecuted Patent Application DE 30 13 235 A1 also discloses a manually operable conical valve for regulating the throughflow of a fluid which is under pressure, distinguished by a valve body with two mutually opposite longitudinal ducts for the inlet and outlet of the fluid, two transverse ducts through the use of which the longitudinal ducts are connected to one another, a sleeve which is movable axially on a thread of the valve body and which with the valve body and the transverse ducts delimits an annular chamber provided with a sealing ring, a closing member which is displaceable axially in the longitudinal outlet duct and which is formed for closing an outlet orifice of the outlet duct, and an elastic device, in that case a spring, which cooperates with the closing member and holds the latter in the open position. That, too, is a pressure regulating valve which has a comparatively complicated construction and in which the compressed air regulation takes place through additional transverse ducts, an additional chamber and a closing member in front of the valve mouth. Moreover, the rotation of the sleeve to adjust the valve on a thread disposed axially on the valve housing is space-consuming. The valve housing has to be constructed so as to be lengthened by the amount of that travel.

SUMMARY OF THE INVENTION

It is accordingly an object of the invention to provide a hand-operated pressure regulating valve for compressed air guns, which overcomes the hereinafore-mentioned disadvantages of the heretofore-known devices of this general type, which can be screwed as a separate compact and lightweight subassembly into any conventional compressed air gun between the mouth and nozzle body and through the use of which a manually regulatable compressed air jet can be generated, with the regulation range being settable from a maximum to a minimum outlet of compressed air for highly sensitive appliances and components, and which operates with low noise and in an energy-saving way and allows easy handling during work.

With the foregoing and other objects in view there is provided, in accordance with the invention, a hand-operated pressure regulating valve for compressed air guns. The pressure regulating valve comprises a longitudinal axis, a pressure regulating unit having a basic body with a centrally disposed nozzle passage piece, a spring pin and a compression spring, a basic valve body having an axially and centrally disposed nozzle passage with a cross section, a transverse bore, an external thread for screwing the pressure regulating valve into a mouth of any compressed air gun, and an internal thread for receiving a nozzle body. The axial and central first nozzle passage is to be bridged and continuously closed within the transverse bore by the nozzle passage piece of the pressure regulating unit. A manually operable actuating ring has a securing ring for holding the pressure regulating unit in the transverse bore of the basic valve body transversely and in a functionally reliable way. The actuating ring has an inner surface area with a plurality of shallow wells integrally formed therein. The actuating ring is manually rotatable in a horizontal plane around the basic valve body and the pressure regulating unit and the nozzle passage piece is transversely displaceable relative to the nozzle passage, for reducing and increasing the cross section of the nozzle passage in vicinity of the transverse bore, within ranges determinable in terms of number and size. In an installed state, the spring pin of the pressure regulating unit projects through the compression spring seated in place out of the basic body and the transverse bore for radial movement transversely relative to the longitudinal axis and, by rotation of the actuating ring, latching in succession into the plurality of shallow wells.

What is advantageous is the simple and lightweight construction of the pressure regulating valve according to the invention which has a continuous nozzle passage, the cross section of which can be reduced and increased, as desired, in a region of the basic valve body through the use of a transversely movable nozzle passage region. This is ensured through the use of a pressure regulating unit according to the invention which is held in a transverse bore, interrupting the nozzle passage of the basic valve body, transversely movably and in a functionally reliable way by an actuating ring adjustable horizontally in one plane, the nozzle passage region disposed in the basic body of the pressure regulating unit bridging the nozzle passage in the basic valve body in the region of the transverse bore and thus forming a closed nozzle passage running from the valve inlet to the valve outlet. There is no need for any additional air ducts or chambers or any nozzle closing member which complicate the construction of the pressure regulating valve and even increase its production cost.

The pressure regulating unit according to the invention, which is to be particularly emphasized, is formed from a basic body with the centrally disposed nozzle passage piece, a spring pin and a compression spring, the spring pin projecting through a compression spring seated in place out of the basic body and the transverse bore of the basic valve body so as to be radially movable transversely with respect to the longitudinal axis of the pressure regulating valve and, by the rotation of the actuating ring, penetrating in succession into a plurality of very shallow wells which are integrally formed in the inner surface area of the actuating ring. Due to the latching of the spring pin into the wells of the actuating ring and to the eccentric configuration of the inner surface area of the actuating ring, the pressure regulating unit moves in the transverse direction and displaces the central nozzle passage piece with respect to the nozzle passage of the basic valve body, as a result of which, depending on the direction of rotation of the actuating ring, the nozzle passage is reduced or increased and the compressed air throughput is diminished or intensified. In the case of a pronounced reduction in the nozzle passage, therefore, compressed air consumption can advantageously be minimized and energy can be saved.

In accordance with another feature of the invention, the structural configuration of the pressure regulating unit, which is also advantageous, makes it possible, on one hand, to lock the pressure regulating unit on the basic valve body in a functionally reliable way in a horizontal plane through the use of the actuating ring and a securing ring, to utilize the actuating ring at the same time as a fastening element and as a regulating element and, by equipping the basic body of the pressure regulating unit on the right and left, next to the nozzle passage piece, in each case with at least one integrally formed sealing lip, to ensure that the nozzle passage and the transversely displaceable nozzle passage piece are sealed off. This does not require any additional sealing elements, and simplifies the construction and production of the individual parts of the pressure regulating valve according to the invention as well as its assembly.

In accordance with a further feature of the invention, due to the construction of the pressure regulating unit and of the actuating ring, their cooperation on the basic valve body is ensured. The basic valve body is capable of being produced as a simple one-part lathe-turned part and the actuating ring as a one-piece injection molding and are capable of being produced cost-effectively.

In accordance with a concomitant feature of the invention, the materials preferably used for the valve parts make it possible, furthermore, to have a lightweight and wear-resistant type of construction of the pressure regulating valve according to the invention which can be screwed as a separate compact and lightweight subassembly onto any conventional compressed air gun between the mouth and nozzle body.

Finally, while being used, any conventional compressed air gun equipped with a compressed air valve according to the invention can be regulated by hand, as required, virtually continuously, and easily in manual terms and so as to save work time. The pressure of the air emerging from the nozzle body can be reduced or increased within a broad regulating spectrum and the compressed air gun can also be used for cleaning the most sensitive components and appliances.

Other features which are considered as characteristic for the invention are set forth in the appended claims.

Although the invention is illustrated and described herein as embodied in a hand-operated pressure regulating valve for compressed air guns, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
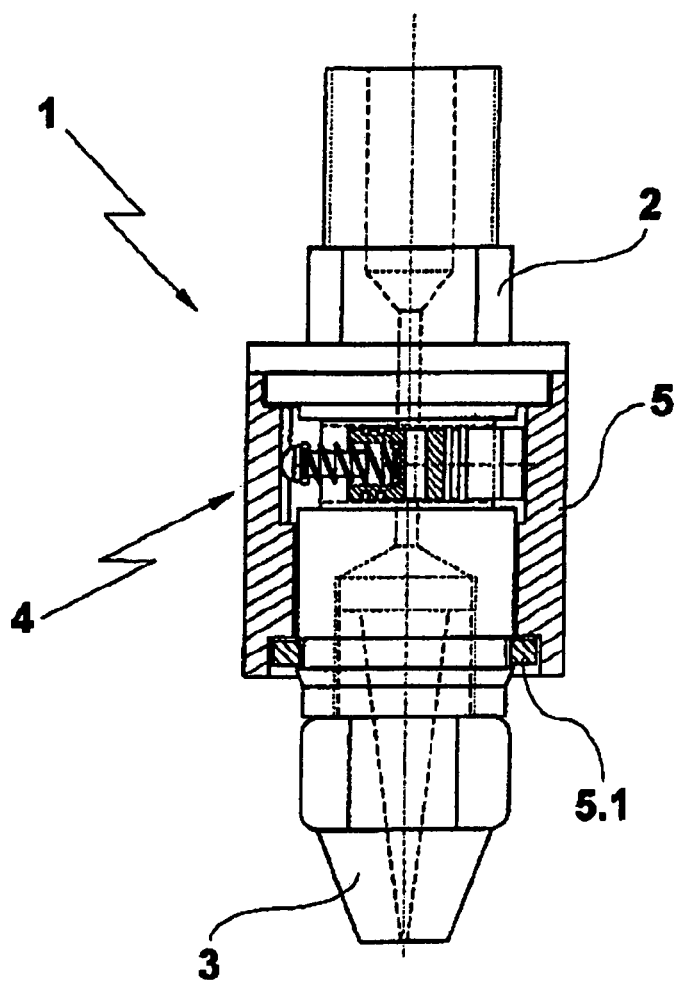
FIG. 1 is a diagrammatic, elevational view of a complete compressed air regulating valve according to the invention, shown in a longitudinal section in the region of an actuating ring.
Figures 3, 5:
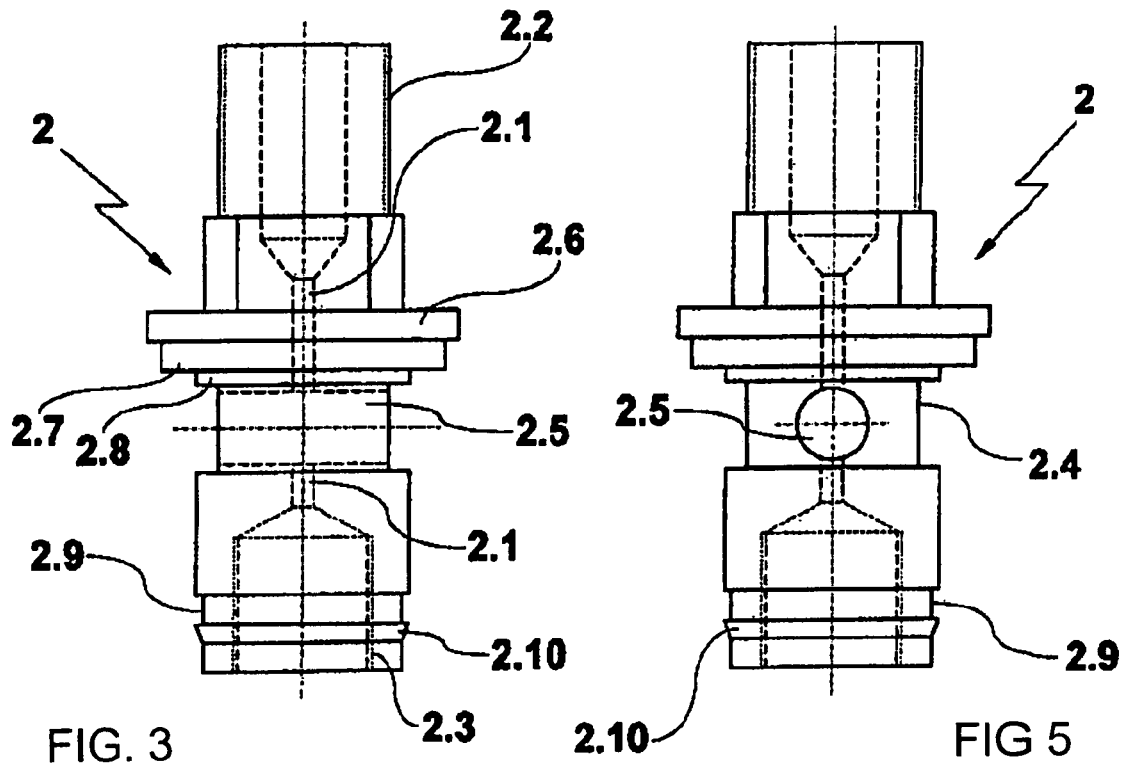
FIG. 3 is an elevational view of an unequipped basic valve body.
FIG. 5 is an elevational view of the unequipped basic valve body, which is offset at 90° with respect to FIG. 3.

Referring now to the figures of the drawings in detail and first, particularly, to FIG. 1 thereof, there is seen an exemplary embodiment of a pressure regulating valve 1 according to the invention, which is formed preferably of a basic valve body 2, a pressure regulating unit 4, an actuating ring 5 and a securing ring 5.1. According to FIG. 3 and FIG. 5, the basic valve body 2 is a one-piece lathe-turned part being formed, for example, of aluminum and has an axial central nozzle passage 2.1, an external thread 2.2 for screwing the pressure regulating valve 1 into the mouth of any compressed air gun, an internal thread 2.3 for screwing in a nozzle body 3, a first groove 2.4, a transverse passage bore 2.5 in the region of the groove 2.4, three collar surfaces 2.6, 2.7 and 2.8 formed one on the other and having different diameters, a second groove 2.9 and a chamfer 2.10.

Figures 4, 6:
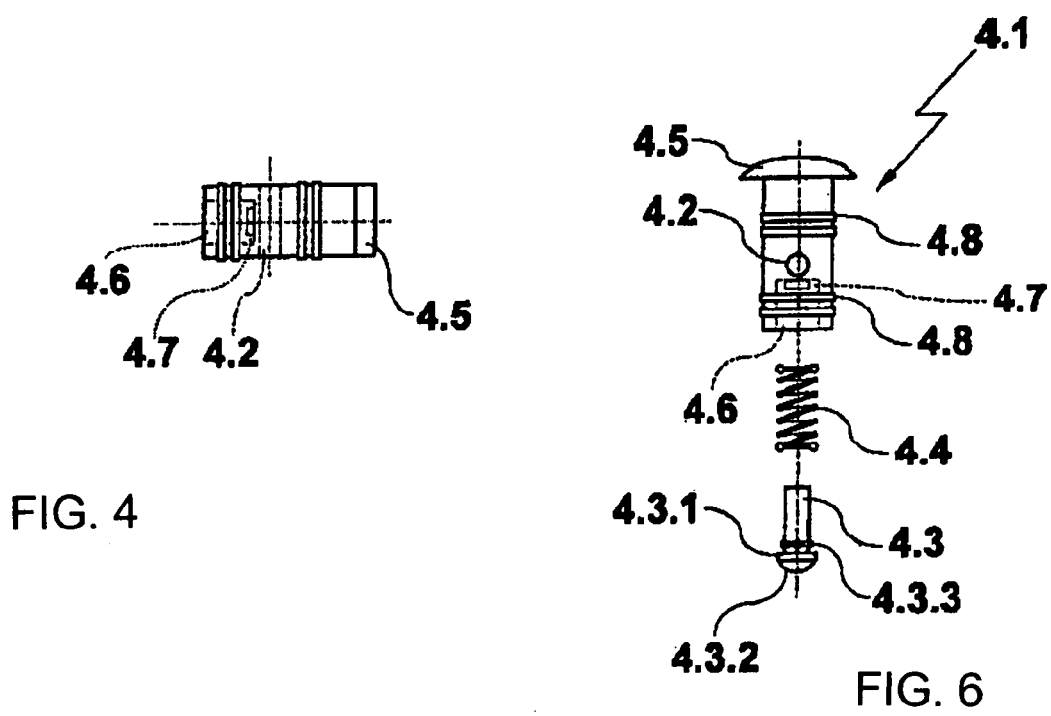
FIG. 4 is an elevational view of a basic body of the pressure regulating unit.
FIG. 6 is an exploded, elevational view of the basic body of the pressure regulating unit, which is offset at 90° with respect to FIG. 4, with a spring and a spring pin.

The pressure regulating unit 4 is formed, according to FIG. 4 and FIG. 6, of a basic body 4.1 with a centrally disposed nozzle passage piece 4.2, a cavity 4.6 disposed on one end face of the basic body 4.1 and occupying approximately one third of the basic body 4.1, a depression 4.7 on the bottom of the cavity 4.6 for latching a compression spring 4.4, a latching element 4.5 integrally formed on the opposite end face at right angles to the nozzle passage piece 4.2, and sealing lips 4.8 which are integrally formed on the outer surface area of the basic body 4.1 on the right and left of the nozzle passage piece 4.2, a spring pin 4.3 and the compression spring 4.4. In the exemplary embodiment, the basic body 4.1 and the spring pin 4.3 are formed of a slidable and abrasion-resistant plastic and the compression spring 4.4 of simple spring steel. The compression spring 4.4 is plugged onto the spring pin 4.3 and with its first turn latches between an annular elevation 4.3.3 and a cylindrical collar 4.3.1 integrally formed on the spring pin 4.3 on one side, the compression spring 4.4 being constructed to be longer than the spring pin 4.3. The spring pin 4.2 equipped with the compression spring 4.4 is plugged into the cavity 4.6 of the basic body 4.1, and the free end of the compression spring 4.4 is anchored against falling out in the depression 4.7 of the cavity 4.6. The pressure regulating unit 4 thus completed is inserted into the passage bore 2.5 in the region of the first groove 2.4 of the basic valve body 2, so that the latching element 4.5 of the basic body 4.1 latches in the first groove 2.4 against horizontal twisting and the outer surface, in the form of a segment of a circle, of the latching element 4.5, completes the outer surface area of the basic valve body 2 in the region of the groove 2.4. The nozzle passage piece 4.2 then connects the two central and axial nozzle passages 2.1 in the basic valve body 2 to one another to form a continuous nozzle passage.

Figure 2:
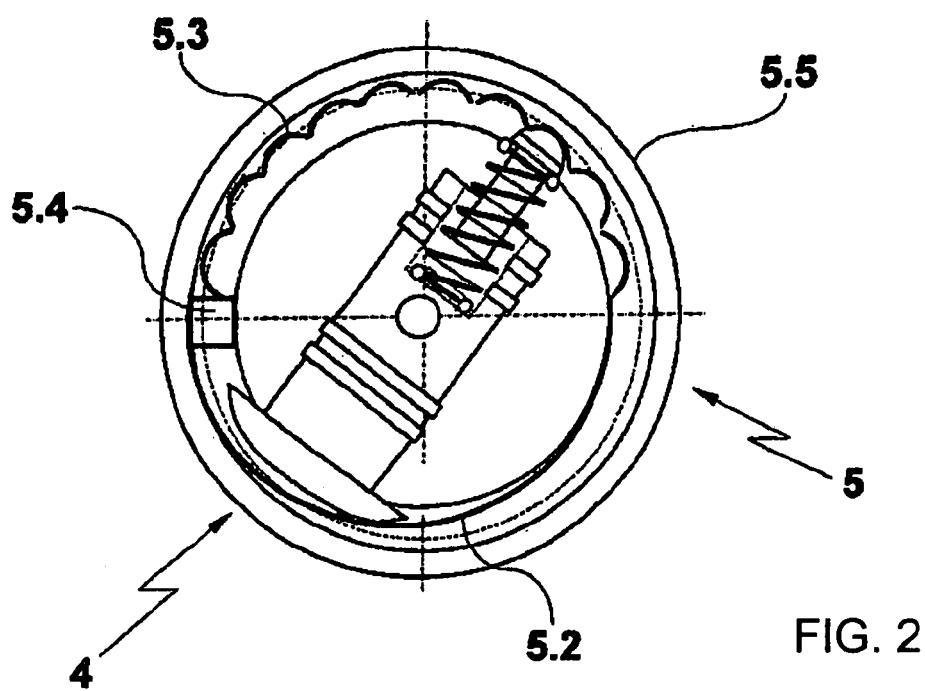
FIG. 2 is a top-plan view of a non-mounted actuating ring with position determination of a pressure regulating unit according to the invention.
Figure 7:
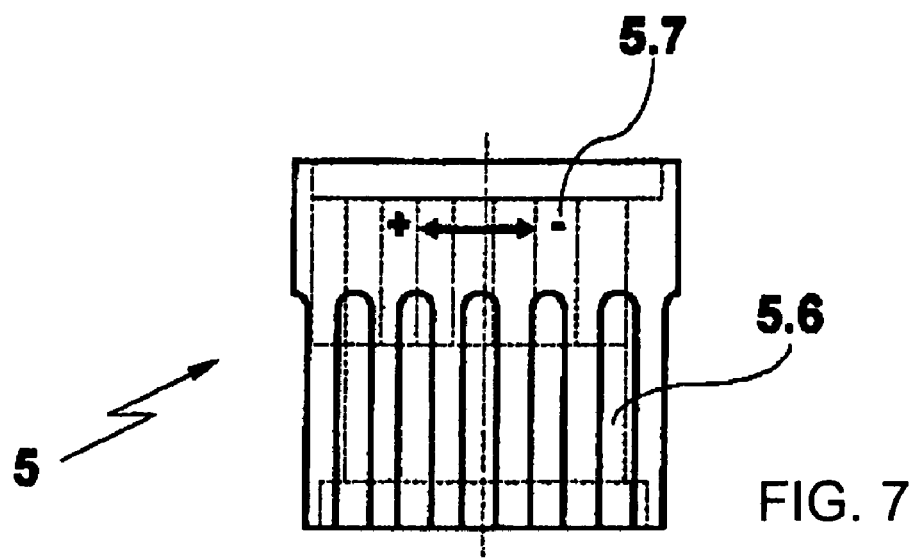
FIG. 7 is an external, elevational view of the actuating ring according to the invention.
Figure 8:
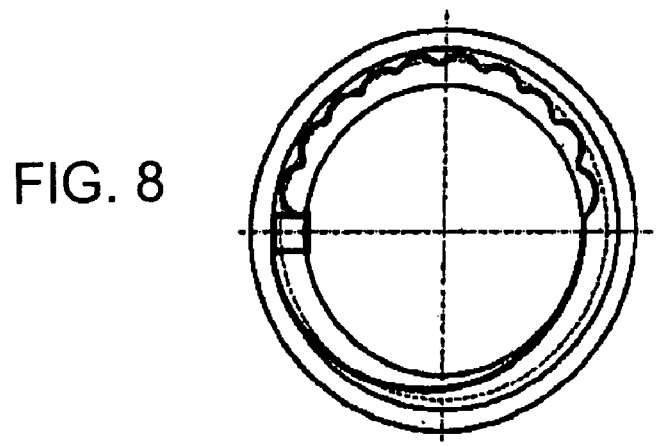
FIG. 8 is a top-plan view of the actuating ring.
Figure 9:
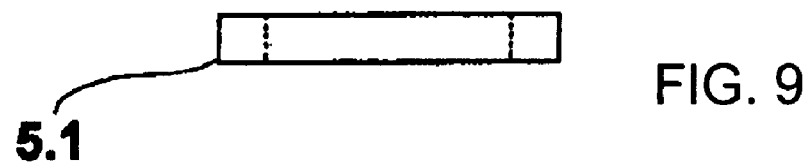
FIG. 9 is a front-elevational view of a securing ring.

The actuating ring 5 according to the invention, which according to FIG. 2, FIG. 7 and FIG. 8 is formed preferably of a one-piece injection molding being formed of plastic, has an inner surface area 5.2 which in the axial direction has, approximately over half, an eccentric shape, and is equipped with a stop 5.4 and a plurality of wells 5.3 directed concavely and semicircularly toward the center of the actuating ring 5 and integrally formed into the inner surface area 5.2. The outer surface area 5.5 of the actuating ring 5 is distinguished in the axial direction, preferably over about two thirds, by a knurled edge 5.6 and, in the last third, by a horizontally oriented arrow indicator 5.7 with a plus sign, on one hand, and a minus sign, on the other hand, by which the opening and closing direction of the pressure regulating valve 1 is marked. This actuating ring 5, then, is pushed in the axial direction, with the rotation direction indicator first, onto the basic valve body 2 in the direction of the collar surfaces 2.6, 2.7 and 2.8, where it latches on the collar surface 2.7 and is flush with the collar surface 2.6 on the outside diameter and with the collar surface 2.8 on the inside diameter of the basic valve body 2. At the same time, according to FIG. 2, the completed pressure regulating unit 4 seated in the passage bore 2.5 of the basic valve body 2 latches with the spring pin 4.3 projecting out of the passage bore 2.5 into one of the wells 5.3 of the actuating ring 5 in the transverse direction. Finally, the securing ring 5.1, preferably being formed of plastic, is pushed according to FIG. 9 in the axial direction onto the basic valve body 2 and is latched through the chamfer 2.10 into the second groove 2.9 of the basic valve body 2, with the result that the pressure regulating unit 4 and the actuating ring 5 are locked and fastened on the basic valve body 2 in a functionally reliable way and the actuating ring 5 is force-lockingly held by the securing ring 5.1. A force-locking connection is one which connects two elements together by force external to the elements, as opposed to a form-locking connection which is provided by the shapes of the elements themselves.

The manually regulatable pressure regulating valve 1 assembled according to the invention is then screwed with the external thread 2.2 into the mouth of any compressed air gun, and a conventional nozzle body 3 is screwed into the internal thread 2.3. By turning the actuating ring 5 horizontally, which is also possible very easily while work is being carried out, the basic body 4.1 of the pressure regulating unit 4 is displaced in the transverse direction in the passage bore 2.5, with the result that the nozzle passage piece 4.2 is also displaced according to FIG. 1 with respect to the central and axial nozzle passages 2.1, and, depending on the direction of rotation, the nozzle passage 2.1 is reduced or increased and therefore the pressure of the air emerging from the compressed air gun is diminished or raised.

The invention claimed is:

1. A hand-operated pressure regulating valve for compressed air guns, the pressure regulating valve comprising:

a longitudinal axis;

a pressure regulating unit having a cylindrical basic body with a centrally disposed nozzle passage piece, said basic body having one side being closed by a latching element in the form of a segment of a circle and another side with a spring pin and a compression spring;

a basic valve body having an outer surface area, an axially and centrally disposed continuous nozzle passage with a cross section, a transverse bore, an external thread for screwing the pressure regulating valve into a mouth of any compressed air gun, and an internal thread for receiving a nozzle body, said axial and central continuous nozzle passage to be bridged and continuously closed within said transverse bore by said nozzle passage piece of said pressure regulating unit projecting from said transverse bore on both sides;

said latching element and said spring pin lying opposite one another and projecting radially moveably from said transverse bore transversely to said longitudinal axis of the pressure-regulating valve and being directed toward said outer surface area of said basic valve body;

a manually operable actuating ring having a securing ring for holding said pressure regulating unit in said transverse bore of said basic valve body transversely and in a functionally reliable way, said actuating ring having an inner surface area, approximately up to half of said inner surface area of said actuating ring having an eccentric shape in axial direction with a stop and with a plurality of shallow wells being concave, semicircular, equally deep and integrally formed therein;

said actuating ring being manually rotatable in a horizontal plane around said basic valve body for latching said spring pin into said shallow wells on one side with said latching element touching said eccentric surface area on an opposite side, causing said latching element to compress or relax said compression spring in different parts of said eccentric surface area and said pressure regulating unit and said nozzle passage piece to be transversely displaceable relative to said nozzle passage, for reducing and increasing said cross section of said nozzle passage in vicinity of said transverse bore, within ranges determinable in terms of number and size; and in an installed state, said spring pin of said pressure regulating unit projecting through said compression spring seated in place out of said basic body and said transverse bore for radial movement transversely relative to said longitudinal axis and, by rotation of said actuating ring, latching in succession into said plurality of shallow wells.

2. The hand-operated pressure regulating valve for compressed air guns according to claim 1, wherein said basic body includes an open side having a cavity extending approximately over one third of said basic body with a depression for latching said compression spring, and said basic body has an outer surface area with at least one sealing lip on each of the right and the left next to said second nozzle passage, said sealing lips being integrally formed radially and ensuring that said nozzle passage and said nozzle passage piece are sealed off.

3. The hand-operated pressure regulating valve for compressed air guns according to claim 1, wherein said spring pin of said pressure regulating unit has a cylindrical collar on one side with an end face constructed in the form of a segment of a circle and, behind said collar, an integrally formed annular elevation at which said compression spring is held with its first turn on said annular elevation.

4. The hand-operated pressure regulating valve for compressed air guns according to claim 1, wherein said actuating ring is disposed in vicinity of a first groove in said transverse bore between three collar surfaces and a second groove and a chamfer of said basic valve body and is held force-lockingly by said securing ring.

5. The hand-operated pressure regulating valve for compressed air guns according to claim 3, wherein said circular-segment end face of said cylindrical collar has a shape adapted to a shape of said wells integrally formed into said inner surface area of said actuating ring.

6. The hand-operated pressure regulating valve for compressed air guns according to claim 1, wherein said actuating ring has an outer surface area with a knurled edge integrally formed in axial direction over about two thirds of said outer surface area, and said outer surface area has a smooth outer surface over about one third of said outer surface area in which an arrow indicator is integrally formed in horizontal direction with + and − for marking opening and closing directions of the hand-operated pressure regulating valve.

7. The hand-operated pressure regulating valve for compressed air guns according to claim 1, wherein said basic valve body is a lathe-turned part being formed of aluminum, said basic body and said spring pin of said pressure regulating unit are manufactured from a slidable and abrasion-resistant plastic, and said actuating ring and securing ring are manufactured from a plastic without any special stability requirements.

* * * * *